United States Patent
Molesworth et al.

(10) Patent No.: US 6,354,238 B1
(45) Date of Patent: Mar. 12, 2002

(54) COLLAPSIBLE BAIT TANK FOR SEALED BULKHEAD INSTALLATION

(76) Inventors: James Molesworth, 745 Clark Ave., Leucadia, CA (US) 92024; Fred Essig, 1008 Country Club Dr., Escondido, CA (US) 92029

(*) Notice: Subject to any disclaimer, the term of this patent is extended or adjusted under 35 U.S.C. 154(b) by 0 days.

(21) Appl. No.: 09/369,556

(22) Filed: Aug. 6, 1999

(51) Int. Cl.[7] .......................... B63B 35/14; A01K 97/04
(52) U.S. Cl. .......................... 114/343; 114/255; 43/55
(58) Field of Search ............................ 114/255, 343; 119/203; 383/34; 43/55

(56) References Cited

U.S. PATENT DOCUMENTS

| | | | |
|---|---|---|---|
| 530,599 A | * 12/1894 | Oheimb ........................ 190/1 |
| 652,331 A | * 6/1900 | Rudolph .................... 232/43.2 |
| 1,995,830 A | * 3/1935 | Barnsby ...................... 55/369 |
| 4,372,363 A | * 2/1983 | Schmeling ................... 383/12 |
| 4,498,190 A | * 2/1985 | Garlick, III ................. 383/28 |
| 4,642,934 A | * 2/1987 | Carlson et al. ................ 43/55 |
| 4,748,765 A | * 6/1988 | Martin ......................... 43/55 |
| 5,165,198 A | * 11/1992 | Kilian, III ..................... 43/55 |
| 5,212,902 A | * 5/1993 | Moorhead et al. ............ 43/55 |
| 6,105,305 A | * 8/2000 | Edens ........................ 43/54.1 |

* cited by examiner

Primary Examiner—S. Joseph Morano
Assistant Examiner—Andrew Wright
(74) Attorney, Agent, or Firm—Donn K. Harms

(57) ABSTRACT

A collapsible bait tank apparatus for use in combination with a water craft such as a kayak with a hull sealed from water intrusion into interior compartments for a permanent mounting or in a portable embodiment capable of transport to multiple watercraft. The device features a collapsible plastic container to hold water to maintain live bait in an aquatic environment which will maintain a watertight seal against intrusion by exterior water into the sealed interior of the water craft in a mounted mode. A hinged interior sealing ring mated to the collapsible container cooperatively engages an exterior sealing ring for a fixed mount or a hinged upper support for a portable mount. The fixed mount using the collapsible container allows a large container to be inserted into a small aperture of a watercraft and maintains a seal from exterior water entering the sealed cavities of the craft. In the portable embodiment the device will expand to hold bait during use and thereafter collapse for easy transport and storage. An optional electric pump powered water conduit system can provide a stream of water for the bait container when in use or in an emergency function as a sump pump.

8 Claims, 3 Drawing Sheets

COLLAPSIBLE BAIT TANK FOR SEALED BULKHEAD INSTALLATION

BACKGROUND OF THE INVENTION

1. Field of the Invention

The present invention relates to bait tanks used to maintain live bait for fishing. More particularly it relates to a bait tank that is collapsible and insertable through apertures in a boat or kayak surface that can be smaller than the expanded bait tank once installed. Once so inserted through such an aperture, the bait tank may be expanded to an installed size larger than the aperture, and attached to the underside of a wall of the boat or kayak about that aperture, in a sealed relationship, thereby maintaining the watertight integrity of the vessel.

2. Prior Art

Modern boats for individual recreational use have evolved to include numerous designs for craft that can be used for exercise, exploration, and sport. Kayaks being a member of this class of water craft have developed a number of classes of craft including those of wooden, resin, fiberglass and polyethylene or a similar polymer walled construction. One overriding factor in such small water craft, as well as in larger pleasure craft, is the requirement to keep the craft water tight. This is especially true of kayaks used in ocean coastal waters as well as those that run rapids or just cruise river ways or inland lakes. Waves and water disturbances encountered by users of kayaks and other water craft can quickly swamp the craft and endanger the rider. Even if the craft is designed to be unsinkable through the inclusion of buoyant materials in the construction of the craft, if allowed to take on water during use, the craft becomes slow and unwieldy.

As use of kayak style water craft has become more prevalent in recent years, so too has the desire to vary that use. Kayak users are well known for cruising waterways, running rapids in fresh water, kayak surfing, or cruising costal waters. Because of their ability to glide to places where aquatic wildlife abounds, there is an ever more widening use of such craft for fishing the coastal waters and inland lakes and streams.

Of course fishing from these small craft creates a problem in itself in that to fish the occupant must have the appropriate gear and of course bait for attachment to that gear to attract the fish sought. Poles, nets, and gear may be lashed to the top of the craft or be of such a nature as to be small enough to place on the rider's person. However if the water craft occupant wishes to use live bait such as sardines, anchovies, mackerel, minnows, or other small fish, that of course attract bigger fish, it poses the dilemma on how to allow for living space for aquatic creatures on a small craft that is supposed to be water tight.

Kayaks being hydrodynamic for streamline running in the water, are by nature small and conventionally sealed on their top and bottom surfaces to avoid the intrusion of water into the interior cavities. This serves to keep the craft buoyant even in the roughest waters since water is kept out of the craft. In order to maintain a streamlined flow through the water, the paddler of a kayak or similar small craft is essentially precluded from hanging devices over the side of the craft into the water. Doing so will severely hamper the craft's ability to easily navigate through the water and cause extreme fatigue of the paddler in a short period of time due to the loss of hydrodynamic properties caused by drag. An alternative currently practiced by kayak users is to place a bait bucket on the deck of the craft. The paddler however must frequently stop the craft. and dip the bucket to obtain fresh, oxygenated water for the occupants of the bait bucket to keep them alive. Additionally, placing a bait tank, and filling it with water, on the deck of a kayak or other small craft, causes a significant rise in the center of gravity of the kayak. Such a rise in the center of gravity yields an unstable craft prone to a roll-over.

As such, to use live bait on a kayak, the bait tank would best be kept inside the watertight environment of the interior cavities of the craft, yet still seal away exterior water from the remaining interior cavities of the craft without swamping the craft. Consequently there is a need for an easily installed bait tank device that would provide the proper oxygenated aquatic environment for live bait and can be maintained on an interior cavity of a kayak or other water craft. Such a device should also maintain the integrity of the seal the craft enjoys from the water through which the craft operates. Additionally, such a device should provide a mechanism to circulate or change the water inside the tank on a regular basis to maintain the occupants of the tank in a healthy state.

U.S. Pat. No. 5,632,220 (Vento) addresses the need for a portable bait tank with a supply of fresh water, however Vento requires a permanent installation and is not collapsible to allow mounting in the interior of the craft through a small hole.

U.S. Pat. No. 4,945,672 (Raia) teaches an auxiliary bait tank having circulating water aerating the device however Raia is solid in construction and designed for above deck mounting or installation in existing bait containers.

U.S. Pat. No. 4,033,280 (Wood) teaches a boat mountable bait tank with circulating water to keep the bait alive. Wood is designed however for above deck mounting or mounting in bait tank containers already on the vessel and does not allow for transportability nor it is collapsible to fit through small apertures into the wall of the vessel.

As such, there exists a need for an easily and inexpensively manufactured bait tank apparatus, which can be readily attached to an interior cavity of most conventional wood, fiberglass- resin and polyethylene and similar polymer-walled, water craft, and especially kayaks. Such a device should also provide for a water tight seal against swamping or flooding the interior of the craft, from water exterior to the craft. The device should additionally be collapsible to allow for easy mounting in various differing types of water tight cavities that exist in most modem water craft and thus keep deck space of the craft useable while concurrently either lowering or maintaining the center of gravity of the craft.

SUMMARY OF THE INVENTION

Applicants' device is an easily manufactured and installed collapsible bait tank apparatus for transport of live bait and maintaining such live bait in a healthy state in an oxygenated aquatic environment. The device features a collapsible container to hold water to maintain live bait in an aquatic environment. A bulkhead sealing apparatus provides both a mount, and a seal against flooding of the interior of the craft from splashes or swamping, thereby maintaining the water tight integrity of the craft on which it is mounted. The bulkhead sealing apparatus is also hinged or of flexible elastic construction to allow it to compress and fit through small apertures in the water craft.

The collapsible tank is constructed of water tight material such as vinyl coated nylon or polyester fabric. The collapsible bait tank has an access aperture which attaches to, and is accessible through, the bulkhead sealing apparatus, thereby providing the user to access the bait contained therein. The bulkhead sealing apparatus is attachable to the wall of the water craft such as a kayak and thereby provides a mount for the attached bait tank as well as maintaining the craft's water tight ability.

By providing a device which is collapsible, great utility is provided in that the user can collapse the device and insert it through a small aperture or other opening which communicates through the deck or other sidewall of the craft. This opening may already exist and be sealable in the conventional fashion with a water tight door or plug. Or, the opening may be cut into the craft to allow for a mount of the collapsible bait tank using the provided bulkhead sealing apparatus for the mount and to provided access to the collapsible bait tank so positioned in the craft.

The bulkhead sealing apparatus consists of an inner sealing ring that is hinged in the current best mode, or elastic in nature, or otherwise collapsible and returnable to a predetermined size. The inner sealing ring is dimensioned to mate with a cooperatively dimensioned exterior sealing ring. Both sealing rings would be dimensioned for cooperative engagement with the aperture formed through the wall or deck of the water craft when in the final mounting position. To mount the bait tank device in a compartment of the water craft, the hinged or flexible interior sealing ring is compressed to a size slightly smaller than the aperture and inserted therethrough. The interior sealing ring may be attached to the bait tank in a sealed relationship around the access aperture of the bait tank, or it may be a separate piece, depending on the water craft and mounting position on that water craft.

Once inserted through the aperture in the water craft, if the interior sealing ring is attached to the bait tank, it is then returned to its intended mounting size and aligned with the cooperating exterior sealing ring dimensioned to encircle the perimeter of the wall aperture. If it is to be removably attached to the interior of the bait tank, the interior sealing ring would be inserted through the access aperture of the bait tank to the bait tank interior and then aligned with the exterior sealing ring about the wall aperture of the craft. Once so aligned the exterior sealing ring and the interior sealing ring are engaged using conventional fasteners therethrough thereby compressing the perimeter of the tank access aperture between the inner surface of the wall of the craft and the interior sealing ring. The seal achieved between the interior sealing ring and the exterior sealing ring and the interior wall and exterior wall of the craft, can be enhanced using optional O-rings, silicone or other sealants, or other conventional sealant materials.

Through the engagement of the bait tank aperture between the interior sealing ring and the interior wall surface of the craft, a watertight seal is achieved which will only allow water into an interior cavity of the collapsible bait tank while concurrently maintaining the water tight seal with the rest of the craft's interior. While the craft is being navigated to and from destinations, the orifice inside the exterior sealing ring may be sealed using a cooperatively dimensioned cap with "O" ring that may be removably threaded or otherwise conventionally placed into position to block access to the interior cavity of the bait tank.

By the provision of collapsibility of both the tank and interior sealing ring, a large bait tank may thereby be inserted into the hollow areas of a boat or kayak through a hole smaller than the eventually enlarged tank. Further, by adding water flow from the lake or ocean which is being navigated, using a communicating battery powered pump, additional utility is provided in the form of a constant rejuvenating of the water supply to sustain the bait fish in the mounted tank. Additionally, in an emergency the pump may be utilized as a sump pump to help drain water from the inner compartments of the craft should it become flooded by a puncture in the wall surface of the craft.

An object of this invention is to provide for a bait tank for water craft such as a kayak that will hold and maintain live bait therein for transport to a fishing site.

Another object of this invention is to provide such a bait tank, and concurrently maintain the seal of the craft from flooding from the exterior of the craft.

A further object of this invention is the provision of a collapsible bait tank that is water tight and will allow for expansion and holding of more bait therein in a healthier environment once inserted through a smaller aperture in the vessel wall.

A further object of this invention is the provision of a collapsible bait tank that is easily transported once drained thereby allowing for portable use of the collapsible bait tank on different vessels by mounting it in a collapsible frame.

Another object of this invention is the provision of a bait tank for small craft that can be accommodated by heretofore unusable space of the interior of the water craft while concurrently maintaining or lowering the center of gravity of the water craft.

Further objects of the invention will be brought out in the following part of the specification, wherein detailed description is for the purpose of fully disclosing the invention without placing limitations thereon.

BRIEF DESCRIPTION OF DRAWING FIGURES

DETAILED DESCRIPTION OF THE PREFERRED EMBODIMENTS OF THE INVENTION

Figure 1:
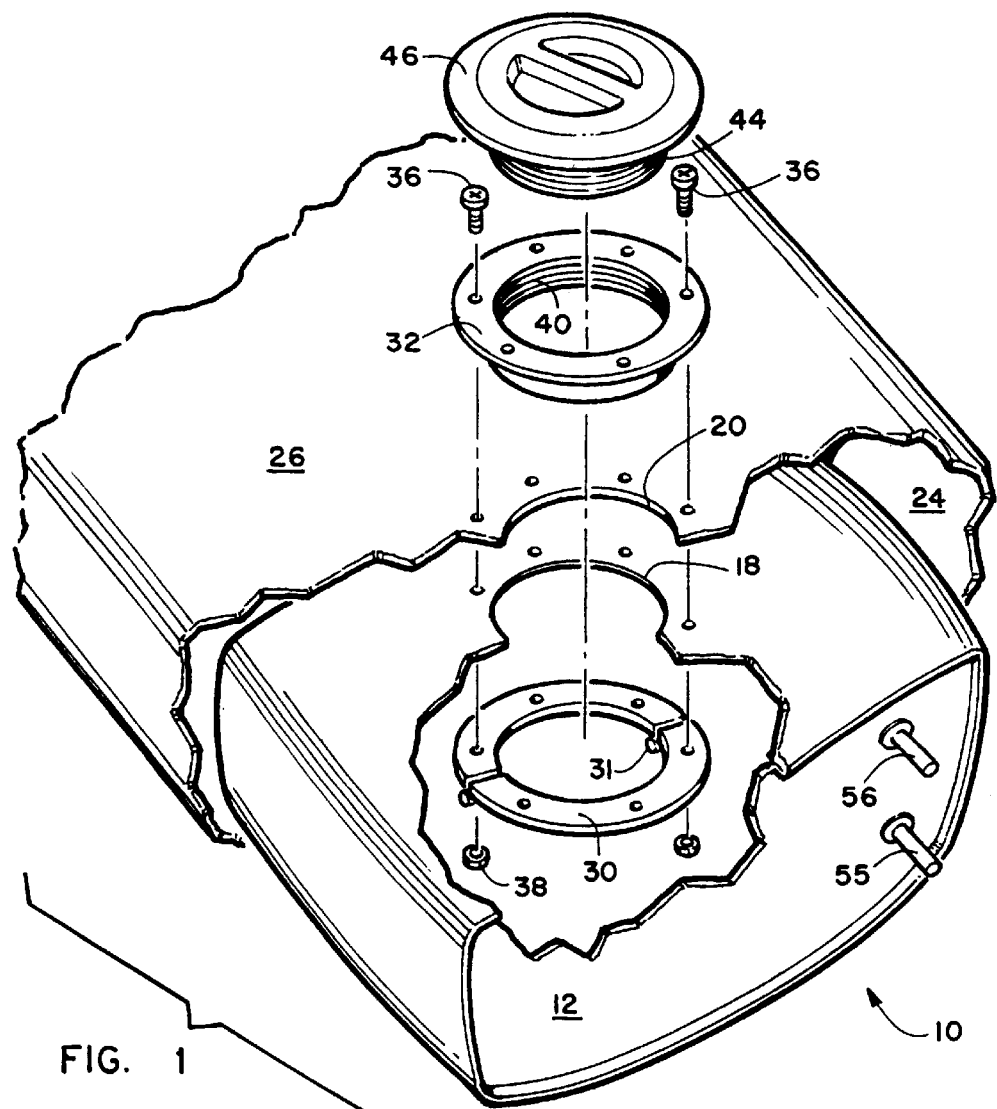
FIG. 1 is a perspective view showing the collapsible bait tank and mounting hardware used to achieve the seal with a vessel wall.
Figure 4:
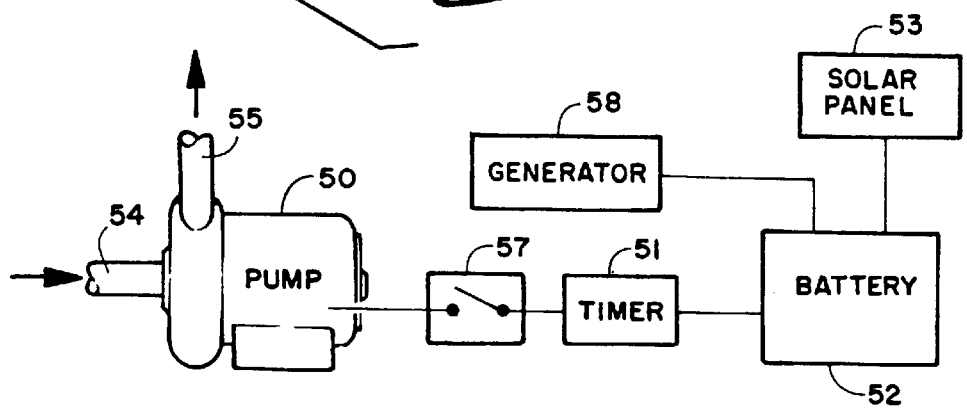
FIG. 4 is a drawing of a pump element of the disclosed apparatus.

Referring now to the drawing Figures, specifically FIGS. 1 through 6 depicts preferred embodiments of the invention herein disclosed and the operation thereof.

Figure 2:
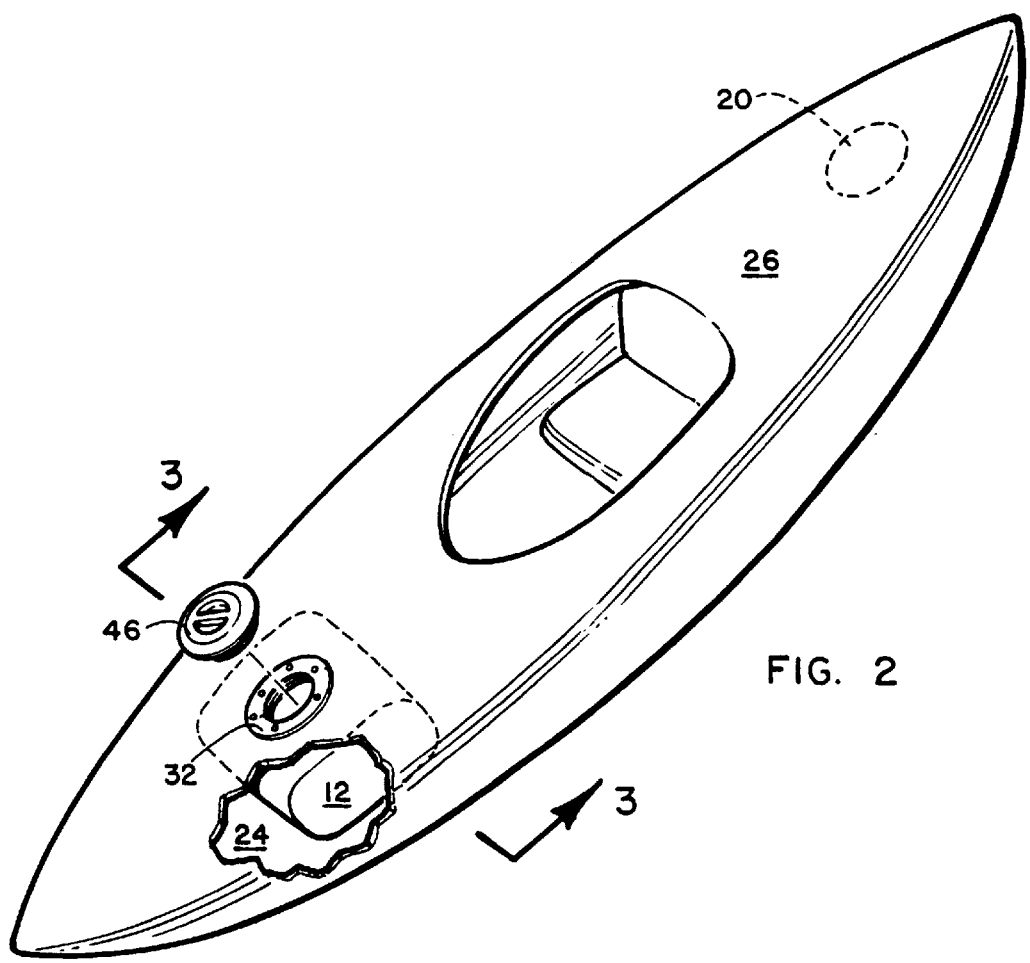
FIG. 2 is a perspective side view of the device as mounted into a kayak or other water craft for use in combination herewith.
Figure 3:
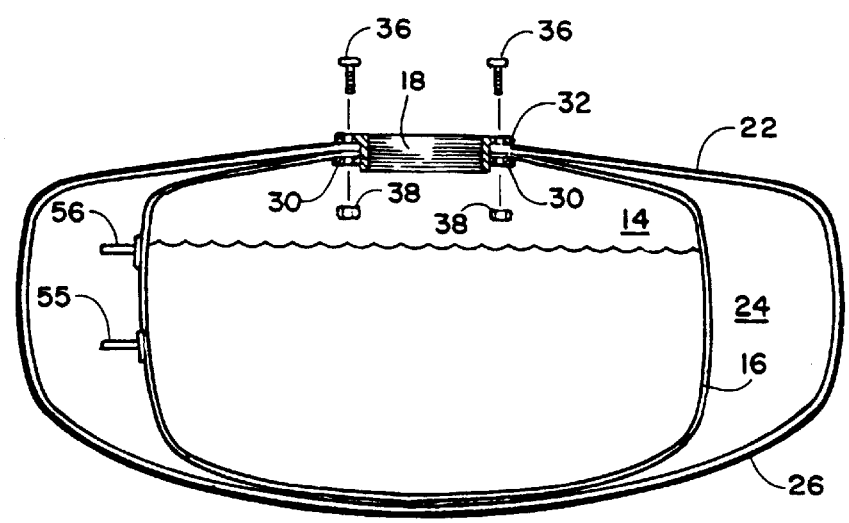
FIG. 3 is a side cut away view of the device at line 3 from FIG. 2.
Figure 5:
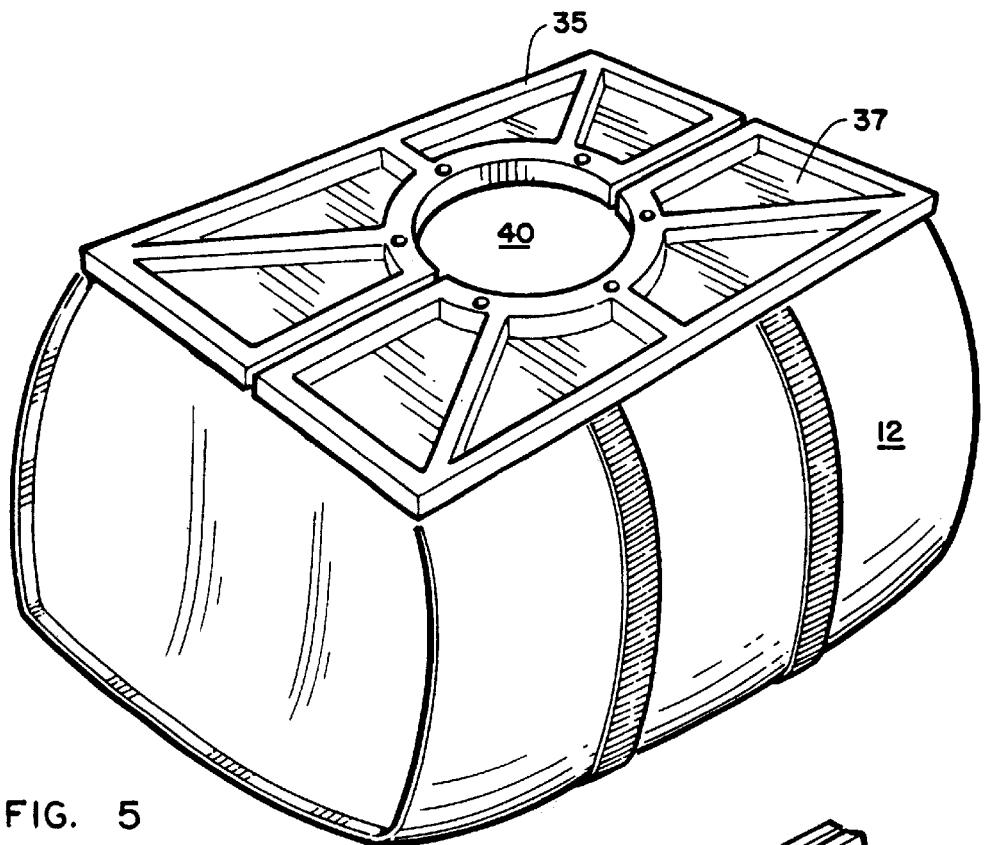
FIG. 5 depicts a collapsible embodiment of the device having a supported top.
Figure 6:
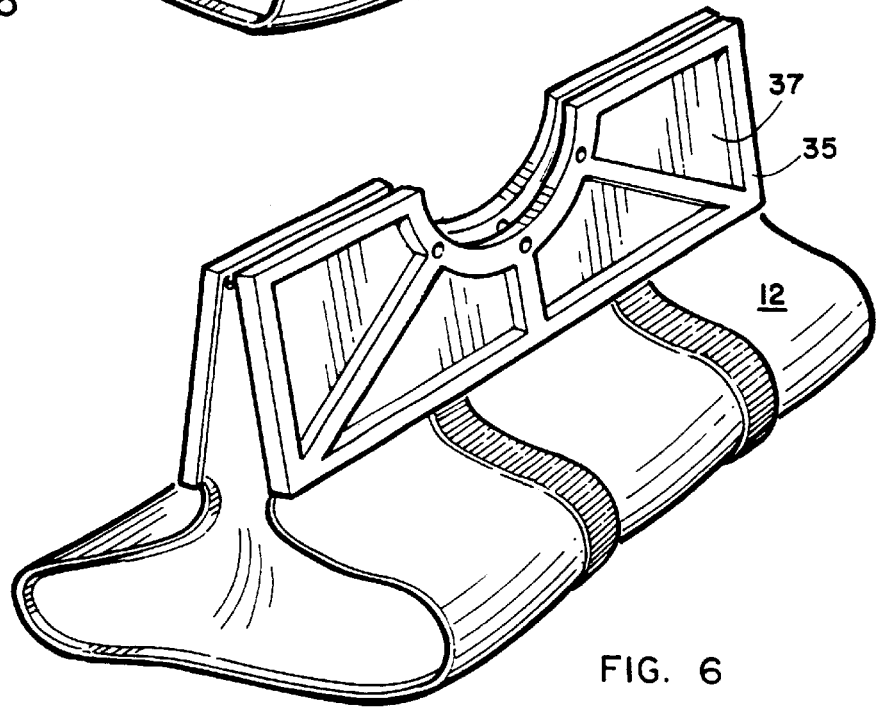
FIG. 6 depicts the supported top hinged in a collapsed position along with the attached collapsible bait tank.

FIGS. 1–3 depict the collapsible bait tank device 10 as it would be mounted and used in the sealed and water tight environment of a kayak or similar water vessel where it would be desirous to maintain interior compartments sealed from water intrusion therein.

The device features a collapsible container 12 to hold water therein in an interior cavity 14 of a dimension defined by the wall 16 of the container. The interior cavity 14 communicate:; to the exterior through a container access aperture 18 thereby providing access to the interior cavity 14 for use and access to bait fish therethrough.

The collapsible container 12 is best constructed of water tight material such as vinyl coated or laminated nylon or polyester fabric which will yield a strong and waterproof container wall 16 defines the dimensions of the interior cavity 14 when the material is cut and assembled to the desired dimensions. The collapsible container 12 is best assembled using glue or heat seal bonding of the edges of the fabric about the seams required to form the three-dimensional container 12 from the flat material to provide a water tight seal at the required seams and a container dimensioned to the proper size to fit the interior cavity of the water craft intended. The container access aperture 18 is provided on one end of the collapsible container 12 for the user to access the bait contained therein with the end opposite the container access aperture being part container walls 16. This access aperture 18 may be dimensioned as desired but currently is depicted in the current best mode as circular in dimension.

By making the device 10 collapsible to a smaller size than the expanded dimension of the device, great utility is provided in that the user can collapse the device 10 and insert it into a small craft wall aperture 20 which communicates through the water tight wall 22 of the craft. This wall aperture 20 may already exist in the craft and be sealable in the conventional fashion with a water tight door or plug, or the wall aperture 20 may be cut into the craft wall 22 for the purpose of allowing insertion of and access to, the interior cavity 14 of the collapsible container 12 so inserted.

Mounting the device 10 to the water craft intended is accomplished by collapsing the container 12 and the attached interior sealing ring 30, and locating them into the correct position in an interior cavity 24 of the watercraft 26. The collapsible container 12 may then be enlarged to its expanded size as depicted in FIG. 1 which is of a dimension to best accommodate the interior cavity 24 intended. The container access aperture 18 is dimensioned equal to or slightly larger than the craft wall aperture 20 so as to register with the perimeter of the craft wall aperture 20 which is located in the wall 22 of the craft 26. The interior sealing ring 30 in the current best mode is collapsible through the use of two hinged pieces which will fold in half to yield a collapsed diameter smaller than that of the craft wall aperture 20 through which it is to be inserted. The interior sealing ring 30 if formed from a plastic material similar in sealing properties as that of the collapsible container 12 may be glued or heat sealed about the container access aperture 18 in a registered position in the interior cavity -14 or on the exterior of the collapsible container 12. The interior sealing ring 30 may be formed of two pieces and hinged using a conventional mechanical hinge 31 between the two pieces or by using the container wall 16 as the hinging means if the two pieces of the interior sealing ring 30 are glued or sealed to the collapsible container 12. While the interior sealing ring 30 could be made of more than two pieces the best sealing of the device 10 against outside water incursion and from leaking of the water in the interior cavity 14 is the use of two pieces in the hinged arrangement.

Mounting is achieved by collapsing the interior sealing ring 30 and collapsing the container 12 and then inserting them though the wall aperture 20 and into the intended interior cavity 14 of the collapsible container 12 through the container access aperture 18. The interior sealing ring 30 pieces is then aligned for proper mating with a cooperating exterior sealing ring 32 dimensioned operatively engage the perimeter of the wall aperture 20 on the exterior surface 34 of the wall 22. Once so aligned the exterior sealing ring 32 and the interior sealing ring 30 are engaged using conventional fasteners such as a nut 36 and bolt 38 therethrough, thereby achieving a seal about the container access aperture 18 between the inner surface 28 of the wall 22 of the craft and the interior sealing ring 30. A second seal is concurrently achieved at the exterior sealing ring 32 and the exterior surface 34 of the craft about the perimeter of the craft wall aperture 20. In this manner a watertight seal is achieved which will only allow water into an interior cavity 14 of the collapsible container 12 while concurrently maintaining the water tight seal with the rest of the craft's interior 24 thereby stopping any intrusion of water into the interior cavity 24 from either the interior cavity of the container 14 or the water exterior to the watercraft 26.

An additional embodiment of the device would feature a portable version which would collapse and expand for use on multiple craft. This embodiment would feature an upper support 35 in place of the exterior sealing ring 32 and the upper support would be hinged in a similar fashion as the interior sealing ring 30 and mated thereto. The upper support 35 in the current best mode is heat sealed or otherwise attached to the upper surface area 37 of the container 12 about the container access aperture 18 to thereby maintain the top of the container 12 in an expanded position for use. Once filled with water the container walls 16 would naturally be forced outward by the force of the water contained. By maintaining the upper surface area 37 in an expanded position, the user can access the bait inside through the orifice 40 in the upper support 35 which aligns with the container access aperture 18.

The components such as the sealing rings are best made from resilient and rust resistant material such a plastic featuring one or a combination of polypropylene or polyethylene or polyvinyl chloride. Vinyl plastics work best in the current best mode especially in the embodiments which would be portable and have an upper support 35 which is attached to the exterior surface of the collapsible container 12 and thereby maintaining an open top and expanded container 12 when in a portable mode. Nut 36 and bolt 38 may also be from plastic material or from non corrosive metals such as stainless steel for best results.

While the craft 26 is being navigated to and from destinations, an optional additional seal may be achieved by sealing the aperture 42 in the exterior sealing ring 32 using a cooperatively threaded or friction fit cap 44 and dimensioned that may be removably mounted into position to block access to the interior cavity 14 of the collapsible container 12. The current best mode features threads 44 on the cap 46 cooperatively engaging threads in the orifice 40.

By the provision of collapsibility, a relatively large bait tank device 10, may thereby be inserted into the hollow areas 24 of a boat or kayak 26 through an aperture 18 smaller than the eventually enlarged collapsible container 12 forming the bait tank for device 10. This allows for a much larger tank container 12 for bait than would normally be available on the deck or in a bucket or small container placed through the aperture 18. Additionally, the container can be custom dimensioned to take advantage of the interior cavity 14 in which it is to sit by dimensioning the container 12 to fit snugly against the walls of the cavity 16 for extra support and a very large sealed area for bait. In the case of the portable embodiment, collapsibility provides the ability to drain and collapse the container 12, and fold the interior sealing ring 30 and cooperatively engaged upper support 35 and flatten the device 10 for easy transport in a vehicle and use in another watercraft.

Additional utility may be provided users of either the fixed embodiment or portable embodiment, through continued water circulation through the container 12 to provide a constant flow of fresh oxygenated water to the bait fish. This optional characteristic is achieved by adding a communicating battery powered pump 50 with power from one or a combination of an onboard battery 52, a solar cell 53 or a generator. The pump would draw water from the water supply exterior to the watercraft 26 through an uptake conduit 54 communicating through the wall 22 of the water craft. The uptake conduit 54 would draw water from the exterior of the craft 26, communicate it through the pump 50, and into the container 12, providing fresh oxygenated water to the bait inside the container 12. An exhaust conduit 56 would communicate through the container wall 16 at the desired height at which the water in the container 12 is to be maintained. This exhaust conduit 56 acts as a drain by communicating water from the upper surface of the water in the interior 14 of the container and thereby constantly maintain that water in the container 12 at a proper height since the water exhaust conduit will naturally drain to maintain that level as new water is provided by the uptake conduit 54 from the pump. Since a constant flow of fresh water is not necessary to maintain the bait in good condition, the pumping action of the pump 50 would best by cycled by a timer 51 so that the power drawn from one or a combination of the battery 52 or other power source aiding the battery such as a generator 58, or solar power cell 53 by the pump 50 is done so for short periods of time sufficient to provide the fresh water needed for the bait. This timed cycle for pump operation significantly lengthens battery life.

Additionally, in an emergency the pump 50 may be utilized as a sump pump to help drain water from the inner compartments 24 of the craft 26 should it become flooded by a puncture in the wall surface of the craft by provision of a detachable uptake conduit 54 from a petcock 56 than can be closed to keep out exterior water during such a detachment. The uptake conduit 54 can then be placed on the bottom interior surface of the craft 26 and the pump 50 activated by a switch 57 to remove water from the craft 26.

While all of the fundamental characteristics and features of the Collapsible bait tank with sealed bulkhead installation have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. A collapsible bait tank for use in combination with a watercraft having an interior cavity accessible through a cavity access aperture in the wall of the watercraft, comprising:

a container, said container being collapsible and having an internal cavity, said internal cavity defined by a sidewall connected to an upper endwall;

a container access aperture communicating with said internal cavity through said upper endwall;

an interior sealing ring formed from a plurality of segments, said interior sealing ring having an interior sealing ring aperture therethrough, said interior sealing ring attached to said upper endwall with said sealing ring aperture in cooperative in line engagement with said container access aperture;

a hinge means connecting said plurality of segments of said interior sealing ring;

said interior sealing ring collapsible from a substantially flat position to a folded position capable of insertion through said cavity access aperture of said watercraft;

said interior sealing ring mountable in cooperative engagement with said cavity access aperture;

a seal, said seal formed between said sealing ring and said cavity access aperture when said sealing ring is mounted in cooperative engagement with said cavity access aperture, whereby said interior sealing ring may be folded and said container attached thereto at said upper endwall, may be collapsed for insertion through said cavity access aperture, and thereafter expanded inside said interior cavity of said watercraft with said seal preventing water from entering said interior cavity of said watercraft when said interior sealing ring is in cooperative engagement with said access aperture.

2. The collapsible bait tank in claim 1 additionally comprising an exterior sealing ring, said exterior sealing ring having an exterior ring aperture therethrough, said exterior sealing ring aperture configured for cooperative engagement with said interior sealing ring, said exterior ring aperture having a perimeter configured for cooperative functional engagement with said cavity access aperture, to allow access therethrough to said internal cavity.

3. The collapsible bait tank in claim 1 wherein said collapsible container has substantially the same external dimensions as said interior cavity of said watercraft.

4. The collapsible bait tank in claim 1 additionally comprising a means to provide water from exterior of said watercraft to said internal cavity of said collapsible container.

5. The collapsible bait tank in claim 4 wherein said means to provide water from exterior of said watercraft is an intake conduit communicating with said water from exterior of said watercraft;

a pump, said pump when energized by a communicated power supply, operating to pump water through said intake conduit into said internal cavity; and a water exhaust conduit, said water exhaust conduit communicating with said internal cavity at determined height on said sidewall, said exhaust conduit communicating water from said internal cavity to the exterior of said watercraft, whereby water is maintained in said internal cavity at said determined height.

6. The collapsible bait tank in claim 5 wherein said communicated power supply is one or a combination of a battery, a generator, or a solar panel.

7. The collapsible bait tank in claim 6 wherein said communicated power supply is cycled on and off by a timer switch.

8. The collapsible bait tank in claim 5 additional comprising a petcock providing communication between said intake conduit at an end distal to said pump and said water, said petcock having an on position in communication with said water, and an off position blocking communication with said water, said intake conduit being disconnectable from said petcock;

whereby said intake conduit may be removed from said petcock when said petcock is in said off position, and said intake conduit may be used to remove water from said interior cavity when said pump is energized.

* * * * *